US008508887B2

(12) United States Patent
Wallash

(10) Patent No.: US 8,508,887 B2
(45) Date of Patent: Aug. 13, 2013

(54) REDUCING RECESSION BY HEATING A MAGNETIC TAPE HEAD

(75) Inventor: Albert Wallash, Morgan Hill, CA (US)

(73) Assignee: HGST Netherlands B.V., Amsterdam (NL)

(*) Notice: Subject to any disclaimer, the term of this patent is extended or adjusted under 35 U.S.C. 154(b) by 660 days.

(21) Appl. No.: 12/629,709

(22) Filed: Dec. 2, 2009

(65) Prior Publication Data

US 2011/0128644 A1   Jun. 2, 2011

(51) Int. Cl.
*G11B 5/56* (2006.01)
*G11B 21/02* (2006.01)

(52) U.S. Cl.
USPC .......... 360/125.74; 360/125.31; 360/122; 360/291; 360/75

(58) Field of Classification Search
USPC ............. 360/31, 75, 90, 221, 231, 291, 122, 360/125.31, 125.74
See application file for complete search history.

(56) References Cited

U.S. PATENT DOCUMENTS

| 5,781,383 | A | 7/1998 | Strand |
| 7,086,931 | B2* | 8/2006 | Oyama et al. .............. 451/7 |
| 7,586,710 | B2* | 9/2009 | Partee et al. .............. 360/75 |
| 7,688,537 | B2* | 3/2010 | Kiyono et al. .............. 360/75 |
| 2003/0174430 | A1* | 9/2003 | Takahashi et al. ........... 360/75 |
| 2005/0152055 | A1* | 7/2005 | Biskeborn .................. 360/31 |
| 2006/0221496 | A1 | 10/2006 | Biskeborn |
| 2007/0291401 | A1* | 12/2007 | Sun et al. .................. 360/75 |
| 2008/0225427 | A1* | 9/2008 | Liu ........................ 360/75 |
| 2008/0310045 | A1* | 12/2008 | Urata ....................... 360/59 |
| 2009/0122436 | A1* | 5/2009 | Partee et al. .............. 360/75 |
| 2009/0154024 | A1* | 6/2009 | Hachisuka et al. ......... 360/313 |
| 2009/0251828 | A1* | 10/2009 | Schreck et al. ............ 360/319 |
| 2009/0257143 | A1* | 10/2009 | Hachisuka ................. 360/75 |
| 2009/0310248 | A1* | 12/2009 | Hachisuka ............... 360/77.01 |
| 2010/0123966 | A1* | 5/2010 | Antoku et al. .............. 360/59 |

FOREIGN PATENT DOCUMENTS

| JP | 59144028 | 8/1984 |
| JP | 2006040447 A * | 2/2006 |
| JP | 2009187595 A * | 8/2009 |

OTHER PUBLICATIONS

I.E.T.IBEN, "Head Reliability of AMR Sensors Based on Thermal Stress Tests", Portal.ACM.org, (2003),415-428.
IBM Corp, "AIX Tape Management", (Aug. 1996),1-321.

* cited by examiner

*Primary Examiner* — Will J Klimowicz

(57) ABSTRACT

A magnetic tape head including a transducer disposed between a substrate, a recession between the transducer and the substrate, where the recession is formed at least by wear from a magnetic tape. The magnetic tape head also includes a heater disposed in the transducer. The heater thermally expands the transducer at a particular location such that the recession is reduced at the particular location.

11 Claims, 3 Drawing Sheets

300 heat a transducer by a heater in the transducer
310 heat a plurality of heaters disposed in the transducer
315

thermally expand the transducer at a particular location on the transducer such that a recession between the transducer and a substrate is reduced at the particular location on the transducer
320 thermally expand the transducer at a plurality of particular locations on the transducer such that the recession between the transducer and the substrate is reduced at the plurality of particular locations
325

FIG. 3

REDUCING RECESSION BY HEATING A MAGNETIC TAPE HEAD

FIELD

Embodiments of the present technology relate generally to the field of magnetic data storage.

BACKGROUND

Magnetic recording tape heads experience significant wear throughout their lifetime due to a magnetic tape rubbing against the magnetic recording tape head. The tape head wear increases the recession of the read/write heads resulting in a significant loss or read/write resolution and a decrease in performance. Moreover, the lifetime of the magnetic tape head is determined by the wear-induced recession.

BRIEF DESCRIPTION OF THE DRAWINGS

FIG. 3 illustrates an example of a flow chart of a method for controlling recession in a magnetic tape head due to wear, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Typically, in a read/write head, there is an initial recession between a transducer (e.g., read/write transducer) and a protective substrate due to lapping. The lapping process removes the material of the transducer faster than the material of the protective substrate because the transducer material is softer than the protective substrate.

The recession between the transducer and the protective substrate increases due to wear of a magnetic tape rubbing against the magnetic tape head. As the recession due to wear increases, the lifetime of the magnetic tape head decreases.

Figure 1:
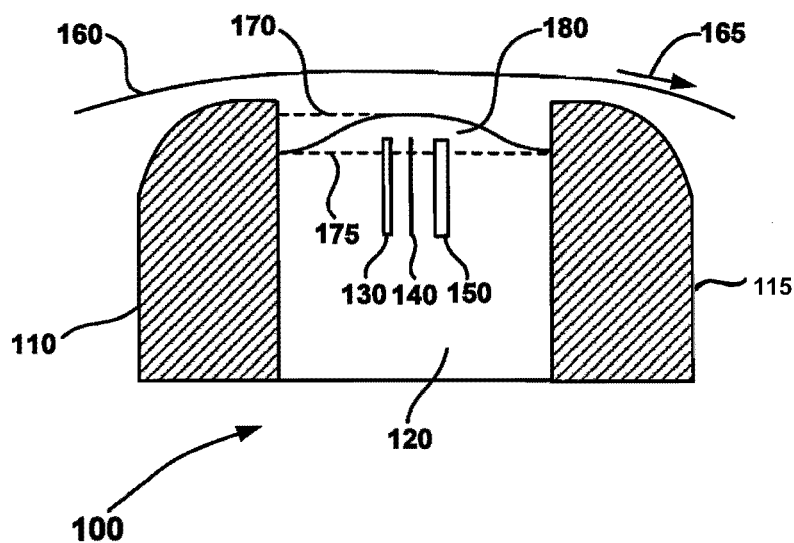
FIG. 1 illustrates an example of a cross-section of a magnetic tape head, in accordance with an embodiment of the present invention.

FIG. 1 illustrates an example of a cross-section of a magnetic tape head 100, in accordance with an embodiment of the present invention. Magnetic tape head 100 includes a protective substrate 110 and 115 configured to protect transducer 120.

Transducer 120 includes a write transducer 130 configured to write data to magnetic tape 160 and a read transducer 150 configured to read data from magnetic tape 160. Transducer 120 can be any read/write transducer compatible with reading data from and writing data to magnetic tape 160.

Magnetic head 100 has an initial recession. The level of the initial recession can be depicted by the line 170. For instance, the initial recession is due to lapping during manufacturing of the magnetic head 100. The initial recession (e.g., line 170) is a height of the transducer 120 that is lower than the height of the protective substrate 110 and 115.

As the magnetic tape 160 travels along the magnetic tape head 100, the magnetic tape 160 rubs against the magnetic tape head and wears away transducer 120. The level of the wear recession can be depicted by line 175. The wear recession (e.g., line 175) further lowers the height of the transducer 120 with respect to the height of protective substrate 110 and 115. Magnetic tape 160 travels in the direction of arrow 165. It should be appreciated that magnetic tape 160 can travel in the opposite direction of arrow 165.

As the recession increases during the lifetime of the magnetic head 100 due to wear of the magnetic tape 160, the signal-to-noise ratio (SNR) of magnetic head decreases because the spacing between the transducer 120 and the magnetic tape 160 increases. If the recession (that increases during the lifetime of the magnetic head) reaches a threshold level, the magnetic head 100 fails because the SNR at the threshold level is not compatible with reading/writing data.

Heater 140 is disposed within the transducer 120 and configured to heat the transducer to reduce the recession due to wear. As heater 140 is heated, the transducer 120 thermally expands at the particular location where the heater is disposed in the transducer. The heater 140 produces a bulge 180 that reduces the recession. In other words, the heater 140 (when heated) changes the profile of the transducer 120 such that the recession is reduced. Thus, the lifetime of the magnetic head 100 increases because the recession is reduced. Moreover, when the recession is reduced, a SNR sufficient to read/write data is provided for a longer period of time compared to if the recession was not reduced.

In one embodiment, heater 140 is disposed centrally between the protective substrate 110 and 115 that surrounds the transducer 120. In another embodiment, heater 140 is a designated heater solely for the function of heating transducer 120. In a further embodiment, magnetic tape head 100 does not include a designated heater and the heating is provided by the write transducer 130.

Typically, a magnetic tape head includes a plurality of transducers in a longitudinal direction. For example, a magnetic tape may have a plurality of tracks (e.g., 16) for reading/writing data. Accordingly, the magnetic tape head has 16 corresponding transducers for reading/writing data. In one embodiment, each transducer (e.g., 16) has a designated heater. The plurality of heaters designated for each transducer are connected in series. When connected in series, the heaters require only two leads, rather than two leads for each heater, if not connected in series.

Figure 2:
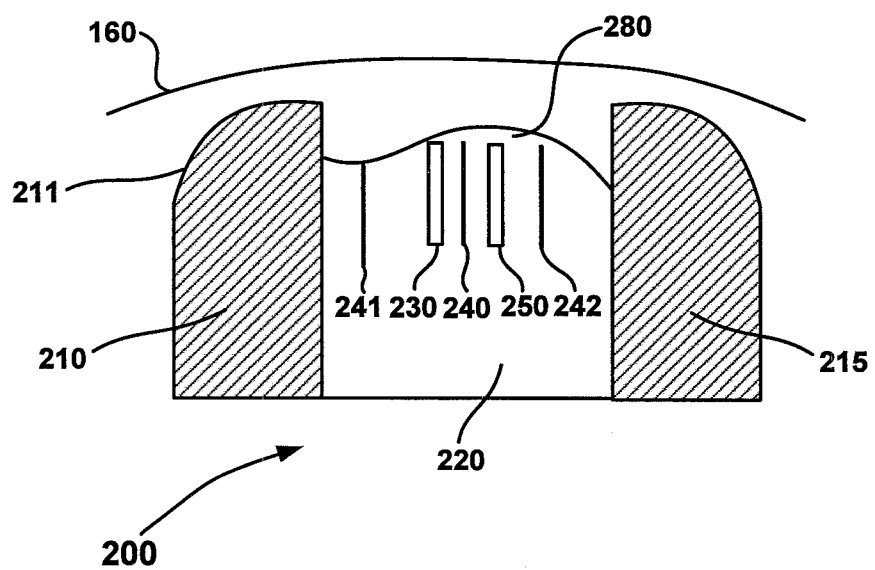
FIG. 2 illustrates an example of a side-view of a magnetic tape head, in accordance with an embodiment of the present invention.

FIG. 2 illustrates an example of a cross-section of a magnetic tape head 200, in accordance with an embodiment of the present invention. Magnetic tape head 200 includes a plurality of heaters 240-242 disposed within the transducer 220. Heater 240 is disposed centrally between the protective substrate 210 and 215. Heater 241 is disposed between the write transducer 230 and the protective substrate 210. Heater 242 is disposed between the read transducer 250 and the protective substrate 215. FIG. 2 depicts three heaters 240-242, however, any number of heaters can be disposed within transducer 220 to change the profile of transducer 220 in any number of configurations.

Magnetic tape head 200 includes a tape wear region 211 on substrate 210 from magnetic tape 260 rubbing on substrate 210 as the magnetic tape travels across magnetic head 200. The occurrence of tape wear region 211 causes the spacing between the magnetic tape 260 and the transducer 220 to increase, thereby, reducing the SNR between the transducer and the magnetic tape. In particular, the spacing increases in proximity to substrate 215.

Heater 242 can be heated to thermally expand the transducer 220 in the region where the spacing has increased due to the tape wear region. By heating heater 242 a bulge 280 is created in the proximity of substrate 215. The bulge 280 reduces the recession due to wear and also reduces the spacing between the magnetic tape 160 and the transducer 220. In other words, heater 242 is used to change the profile of the transducer 220 to reduce the recession due to wear and also reduce the spacing between the magnetic tap 160, which in turn increases the SNR. In another embodiment, heaters 240 and 242 are heated to create bulge 280 in the region proximate substrate 215. It should be appreciated that any combination of heating of heaters can be used to change the profile of transducer 220 in order to reduce recession due to wear. Moreover, the plurality of heaters can correct for any mechanism that changes the spacing between the transducer and the magnetic tape.

FIG. 3 illustrates an example of a flow chart of a method for controlling recession in a magnetic tape head due to wear, in accordance with an embodiment of the present invention. In one embodiment, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 300 is performed at least by the system of FIG. 1 and/or FIG. 2.

At step 310, a transducer is heated by a heater in the transducer. In another embodiment, at step 315, a plurality of heaters are disposed in the transducer are heated. In one embodiment, the heater is centrally disposed between the substrate. In another embodiment, a plurality of heaters are disposed in series in a longitudinal direction of the transducer.

In another embodiment, in response to reaching a signal-to-noise ratio (SNR) threshold, the transducer is heated the heater(s) in the transducer. For example, the amplitude of the SNR is measured during the use of the magnetic tape head. As the recession increases due to wear, the amplitude of the SNR decreases. At a certain SNR threshold, the heater(s) are heated.

At step 320, the transducer is thermally expanded at a particular location on the transducer such that a recession between the transducer and a substrate is reduced at the particular location on the transducer. In another embodiment, at step 325, the transducer is thermally expanded at a plurality of particular locations on the transducer such that the recession between the transducer and the substrate is reduced at the plurality of particular locations. In a further embodiment, the recession due to wear if overcome.

In yet another embodiment, in response to increased spacing between a magnetic tape and the transducer by wear on said substrate, the spacing is reduced by changing a contour of the transducer.

Various embodiments of the present invention are thus described. While the present invention has been described in particular embodiments, it should be appreciated that the present invention should not be construed as limited by such embodiments, but rather construed according to the following claims.

The invention claimed is:

1. A magnetic tape head comprising:
   a transducer disposed between a first substrate and a second substrate;
   a recession between said transducer and said substrates, wherein said recession is formed at least by wear from a magnetic tape;
   a first heater disposed in said transducer and located an equal distance from said first and second substrates, wherein said first heater thermally expands said transducer at a particular location and said first heater thermally changes a contour of said transducer such that said recession is reduced at said particular location;
   a second heater disposed in said transducer and located an equal distance from said first substrate and from said first heater, wherein said second heater thermally expands said transducer at a particular location and said second heater thermally changes a contour of said transducer such that said recession is reduced at said particular location;
   a third heater disposed in said transducer and located an equal distance from said second substrate and from said first heater, wherein said third heater thermally expands said transducer at a particular location and said third heater thermally changes a contour of said transducer such that said recession is reduced at said particular location; and
   two leads for connecting all of said first, second and third heaters of said magnetic tape head in a series.

2. The magnetic tape head of claim 1, wherein said first heater comprises:
   a designated heater.

3. The magnetic tape head of claim 1, comprising:
   said first heater is disposed between said second substrate and a write transducer.

4. The magnetic tape head of claim 1, comprising:
   said first heater is disposed between said first substrate and a read transducer.

5. A magnetic tape drive comprising:
   a transducer disposed between a first and second substrate;
   a magnetic tape;
   a recession between said transducer and said substrates, wherein said recession is formed at least by wear from said magnetic tape;
   a first heater disposed in said transducer and located an equal distance from said first and second substrates, wherein said first heater thermally expands said transducer at a particular location and said first heater thermally changes a contour of said transducer such that said recession is reduced at said particular location;
   a second heater disposed in said transducer and located an equal distance from said first substrate and from said first heater, wherein said second heater thermally expands said transducer at a particular location and said second heater thermally changes a contour of said transducer such that said recession is reduced at said particular location;

a third heater disposed in said transducer and located an equal distance from said second substrate and from said first heater, wherein said third heater thermally expands said transducer at a particular location and said third heater thermally changes a contour of said transducer such that said recession is reduced at said particular location; and two leads for connecting all of said first, second and third heaters of said transducer in a series.

6. The magnetic tape drive of claim 5, wherein said substrates comprise:

a magnetic tape wear region, wherein said magnetic tape wear region increases a spacing between said transducer and said magnetic tape and wherein at least one of said first, second or third heaters thermally expands said transducer such that said spacing is reduced between said transducer and said magnetic tape.

7. The magnetic tape drive of claim 5, wherein said first heater comprises:

a designated heater.

8. A method for controlling recession in a magnetic tape head due to wear, said method comprising:

providing a first heater disposed in a transducer and located an equal distance from a first and second substrate, wherein said first heater thermally expands said transducer at a particular location and said first heater thermally changes a contour of said transucer such that said recession is reduced at said particular location;

providing a second heater disposed in said transducer and located an equal distance from said first substrate and from said first heater, wherein said second heater thermally expands said transducer at a particular location and said second heater thermally changes a contour of said transducer such that said recession is reduced at said particular location;

providing a third heater disposed in said transducer and located an equal distance from said second substrate and from said first heater, wherein said third heater thermally expands said transducer at a particular location and said third heater thermally changes a contour of said transducer such that said recession is reduced at said particular location;

providing two leads for connecting all of said first, second and third heaters of said magnetic tape head in a series;

heating said transducer by said first, second and third heaters in said transducer; and thermally expanding said transducer at at least one of said particular locations associated with one of said first, second or third heaters on said transducer and changing a contour of said transducer such that a recession between said transducer and said substrates is overcome at at least one of said particular locations associated with one of said first, second and third heaters on said transducer.

9. The method of claim 8, wherein said heating said transducer comprises:

simultaneously heating said first, second and third heaters disposed in said transducer.

10. The method of claim 8, comprising:

in response to reaching a signal-to-noise ratio (SNR) threshold, said heating said transducer by said first, second and third heaters in said transducer.

11. The method of claim 8, comprising:

in response to increased spacing between a magnetic tape and said transducer by wear on said substrates, reducing said spacing by changing a contour of said transducer.

* * * * *

UNITED STATES PATENT AND TRADEMARK OFFICE
CERTIFICATE OF CORRECTION

PATENT NO. : 8,508,887 B2  Page 1 of 1
APPLICATION NO. : 12/629709
DATED : August 13, 2013
INVENTOR(S) : Albert Wallash It is certified that error appears in the above-identified patent and that said Letters Patent is hereby corrected as shown below:

In the Claims

Column 5, Claim 8, Line 26, Delete: "transucer"

Insert --transducer--

Column 6, Claim 8, Line 12, Delete: "thermally expanding said transducer at at least one of said"

Insert --thermally expanding said transducer at least one of said--

Column 6, Claim 8, Line 14, Delete: "or"

Insert --and--

Column 6, Claim 8, Line 17, Delete: "at at least one of said particular locations associated with"

Insert --at least one of said particular locations associated with--

Signed and Sealed this
Twenty-eighth Day of April, 2015

Michelle K. Lee
*Director of the United States Patent and Trademark Office*